INVENTOR.
JOHN R. WOLCOTT
BY
Christensen Sanborn & Matthews
ATTORNEYS

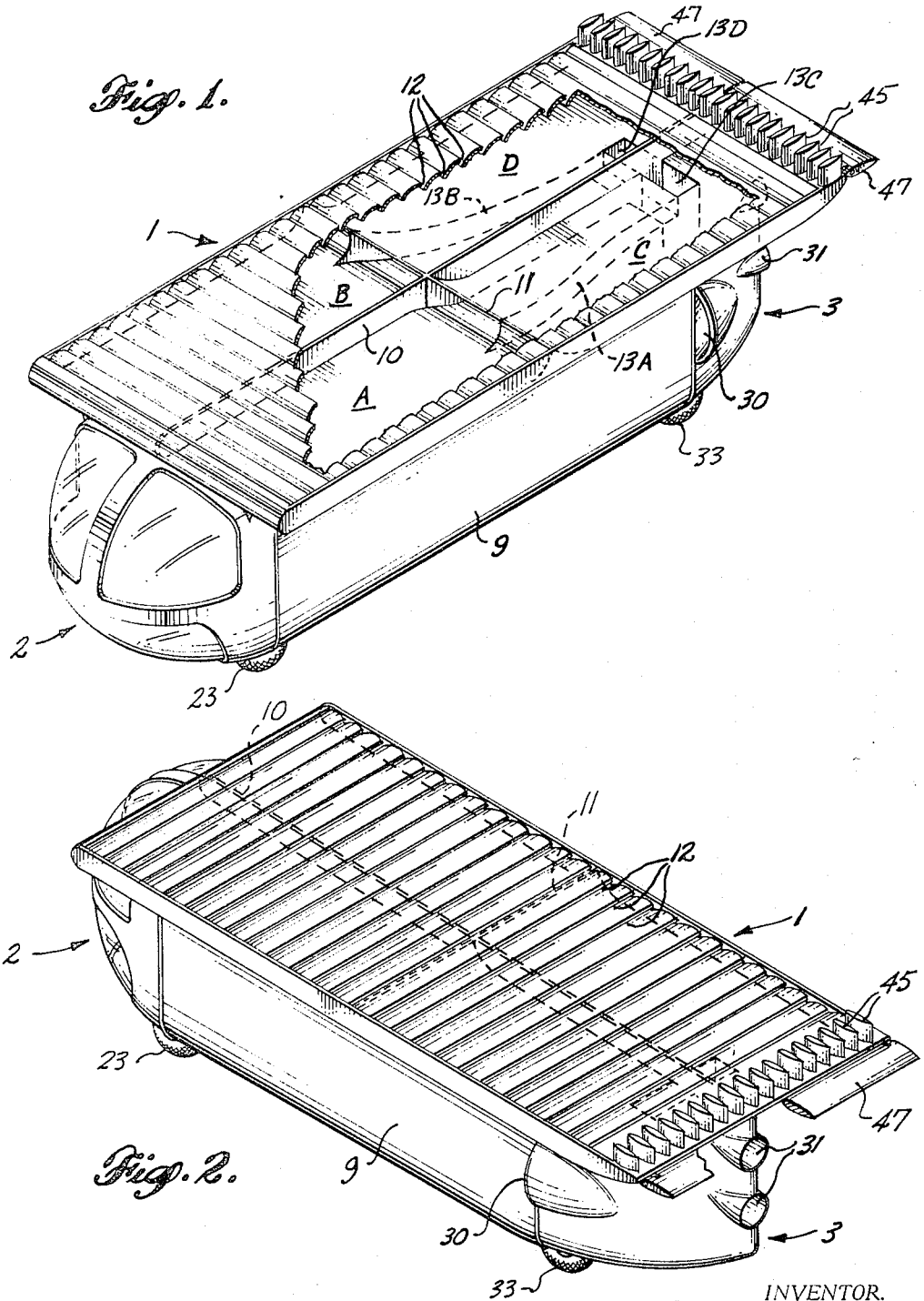

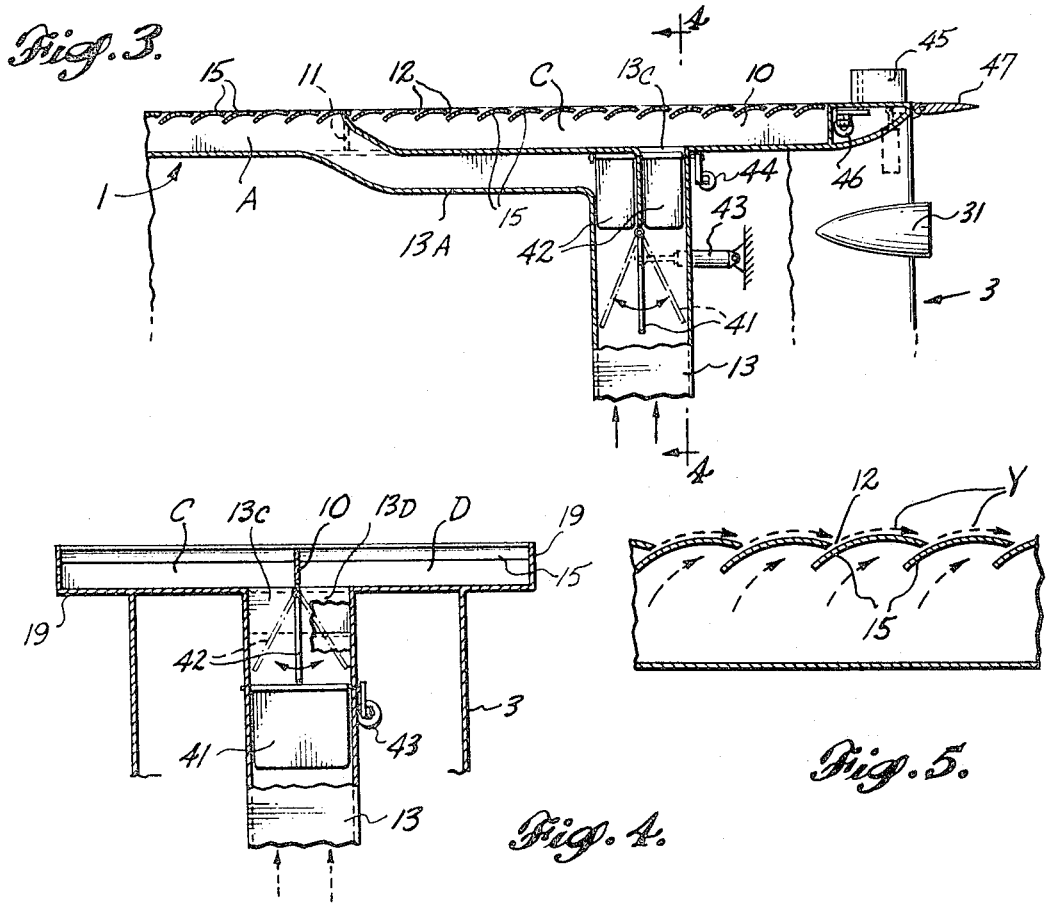

United States Patent Office 3,451,645
Patented June 24, 1969

3,451,645
AERODYNAMIC LIFT VEHICLE
John R. Wolcott, 13630 2nd Ave. S.W.,
Seattle, Wash. 98166
Continuation-in-part of application Ser. No. 456,929,
May 19, 1965. This application Mar. 9, 1967, Ser.
No. 641,396
Int. Cl. B64c 15/00, 29/00, 3/00
U.S. Cl. 244—12        9 Claims

ABSTRACT OF THE DISCLOSURE

An aerodynamic lift vehicle is disclosed which has means thereon defining at least one plenum chamber which extends substantially horizontally over a major portion of the vehicle and is open across the top to the ambient surroundings of the vehicle; and also means thereon for pressurizing the gas in the chamber for discharge into the surroundings through the top opening thereof. The top opening has a multitude of elongated airfoils extending in spaced parallel relationship thereacross whose upper surfaces are substantially coplanar with one another and whose lower surfaces are inclined thereto so that a series of elongated nozzles are formed between the air foils which discharge into the surroundings substantially tangentially to the aforesaid upper surfaces thereof. In addition, the latter surfaces arch smoothly from one nozzle to the next so that the discharges from the nozzles interact with one another to generate an overall lift effect across the opening which is adapted in relation to the weight of the vehicle to displace the vehicle in a direction generally perpendicular thereto.

Cross-reference to related application

This application is a continuation-in-part of my copending application Ser. No. 456,929, now abandoned, filed May 19, 1965, and entitled, "Lift Vehicle."

The basic vehicle shown herein to illustrate the invention may be arranged to pick up a separable passenger or cargo enclosure, to be set down and separated from the basic vehicle at the destination, without disturbance of the power plant or the lift and control provisions, or it may be arranged as an integral vehicle, with its passenger or cargo space and its power plant, lift, and control provisions. The arrangements to this end are not part of the present invention, although in either case the maximum operational weight of the vehicle must be known.

Reference to the drawings

The invention is shown in the accompanying drawings largely in diagrammatic form.

FIGURE 1 is an isometric view, from ahead and above, and with parts of the slot-forming airfoils broken away, illustrating the vehicle, and FIGURE 2 is a similar view from behind and above.

FIGURE 3 is a longitudinal sectional view, showing ducting leading to plenum chambers, whence issue the lift-producing jets, and FIGURE 4 is a transverse sectional view of the same at the line 4—4 of FIGURE 3. These figures illustrate in particular the controls for roll and pitch.

FIGURE 5 is an enlarged longitudinal section of a plenum chamber, transversely of the slots whence the jets issue.

FIGURE 6 is a plan view of the lift-producing area of a modified form of the vehicle which form is especially designed for producing lift only, without any directional effect inherent in the jets themselves, and so is particularly useful in hovering flight, or for movement in any direction by supplemental thrust means or by merely tilting the vehicle toward the desired direction of movement.

Figure 7:
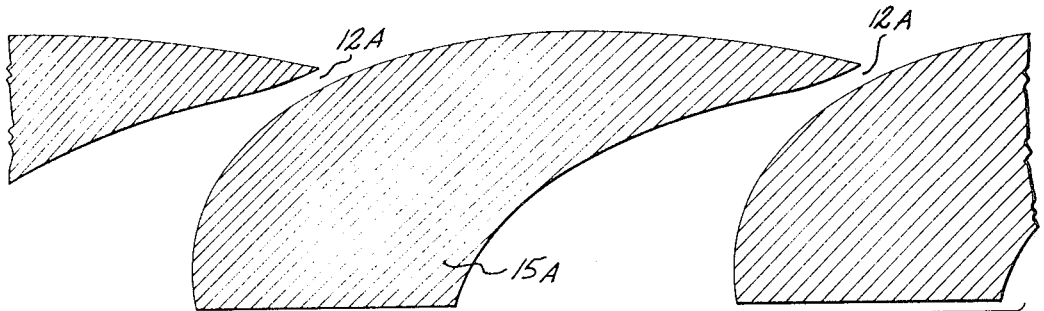
FIGURE 7 is a sectional view, comparable with FIGURE 5, showing a somewhat more practicable arrangement of the slot-forming airfoils.

It may be assumed that the vehicle shown in FIGURE 1 and 2 comprises a basic vehicle the upper structure whereof incorporates lift-producing slots, a control cabin, a power plant, ducting or similar means to deliver air to one or to several plenum chambers for exit through the slots, and rolls, pitch, and directional controls, and that the load is to be carried in an enclosure that is detachable from the basic vehicle, by any suitable provision, at the destination. The load-carrying enclosure is shown at 9, longitudinally intermediate a control cabin 2 and a power plant enclosure 3, each of suitable shape. The cabin 2 and enclosure 3 are interconnected, above the load-carrying enclosure 9, by a structure 1 which has a more or less horizontal upper surface. The structure 1 is largely hollow, to define a plenum chamber or chambers, in this instance shown as divided to provide four individual chambers or quadratures A, B, C, and D, by a longitudinal partition 10 and a transverse partition 11 that intersect in the vicinity of the center of gravity of the vehicle. Ducts 13A, 13B, 13C and 13D are designed to discharge air intaken at 30, in equal volumes under pressure into the respective chambers A, B, C, and D, from a blower (not shown) in the power plant enclosure 3 by way of common duct 13.

The plenum chambers are open at the top to the ambient surroundings of the vehicle, but the top opening has a series of airfoils 15, closely spaced horizontally, to define nozzles 12 therebetween. These nozzles 12 direct air under pressure within the plenum chambers horizontally over the next airfoil downstream. In the vehicle shown in FIGURES 1 to 5 the nozzles are disposed in parallel relation, transversely of the structure 1, and in the form shown in FIGURE 6 the parallel relationship is also found, although here each nozzle is circularly curved. The relationship of the spacing between nozzles, the depth or size of each nozzle, and the velocity produced there and the volumetric capacity of the blower, will be discussed later. In the form illustrated in FIGURES 1 to 5 the nozzle all discharge rearwardly, but because the energy produced there is largely dissipated in producing lift, this would produce but little forward thrust, and I prefer to produce forward propulsion by the thrust produced at jet nozzles 31, or otherwise, as will be described hereinafter.

The disposition of the smoothly curved airfoils is important. The lower edges of the airfoils 15 within the pressurized plenum chamber or chambers, are spaced rather widely, but the upper or trailing edges of the airfoils are rather narrowly spaced from the convex surfaces of the adjacent airfoils in the downstream direction. A maximum spacing between the nozzles 12 of ten inches, and a minimum of two inches has been found preferable, the choice being governed by such factors as size of the surface, air pressure, area of slots, etc. The nozzles open sufficiently widely within the plenum chamber to interpose no obstacle to movement of the air from within towards the exits thereof. The increasingly smaller cross section of the nozzles towards the exits thereof greatly increases the velocity of the exiting air. Also, the nozzles discharge substantially along tangents to the convex surfaces of the airfoils. As a result the thin air film from each nozzle 12 tends to follow the airfoil surface, due to the Coanda effect, as shown by the arrows Y. This supplies energy and velocity to the boundary layer, to generate a steep negative pressure gradient terminating at the upper surface, or in another word, lift. This lift is sufficient in the aggregate to support the vehicle and its load, and to cause the same to lift off the ground, to any reasonable altitude. The vehicle can move at a reasonable speed forward by tilting the nose down, but for high speed flight an auxiliary propulsion source is required. This may be a jet engine discharge at 31, or a conventional air screw or other suitable means.

It is to be noted that no ground effect is involved in producing lift. All jet discharge is horizontally at the upper surface, over airfoil surfaces.

Each jet issues at high velocity, and, other than the last one downstream, tends to hug the convex surface of the next airfoil downstream. The jet that issues from the next nozzle downstream of any given nozzle (at the preferred range of spacing indicated above) facilitates this movement of the upstream jet, acting as an extractor thereon, and so on in succession downstream, wherefore there is no stagnation or slowing of the boundary layer, and adequate lift is produced. It can be realized that there is but little thrust or propulsion effect, since the energy of the jets is largely converted into lift.

A similar lift effect is generated by the structure shown in Figure 7. As with the earlier embodiments, the airfoils 15A have curved cross sections between the leading and trailing edges thereof, and the upper convex surfaces of the same are substantially coplanar with one another. The lower concave surfaces of the airfolds are inclined toward points on the upper surfaces of the adjacent airfoils so that a series of elongated nozzles 12A are formed between the airfoils which discharge into the ambient surroundings of the vehicle substantially tangentially to the aforesaid upper surfaces thereof. In addition, the latter surfaces arch smoothly from one nozzle to the next so that the discharges from the nozzles interact with one another in the manner described above, with the result that an overall lift effect is generated across the arrangement. The leading edges of the airfoils are substantially coplanar with one another. However, contrary to the earlier embodiments, in this instance they are broad and flat in relation to the trailing edges of the airfoils rather than uniform in cross section. The several quadratures A, B, C, and D define several chambers so related, but similar chambers can be defined by other relationships. If the areas of the nozzles 12 from each such chamber are equal, and the pressures and hence the issuing volumes from these several chambers are equal, the lift effects at right and at left of the center of gravity, and ahead of and behind such center of gravity, are equalized, and the vehicle is stabilized horizontally. If the lift effect behind the transverse partition 11 is less than that ahead of that partition, the vehicle inclines upwardly at the nose. Such differentiation of lift can slow down the forward speed, and can produce hovering, or even reverse movement. If the lift effect behind the partition is greater than ahead of it, the vehicle inclines downwardly at the nose and moves forward. This affords pitch control and hence movement forwardly and rearwardly. If the lift effect at the port side of longitudinal partition 10 is less than that at the starboard side, the vehicle tends to roll to port. If the lift at the starboard side is less than that at the port side, the vehicle tends to roll to starboard. This affords roll control, and the vehicle moves in the direction of roll. Simultaneous pitch control and roll control can be thus produced by relative control of the lift effect at the four quadratures A, B, C, and D of the structure 1.

While any convenient means can be employed for thus varying the lift effect, a simple and effective means to this end is illustrated in Figures 3 and 4. The common duct 13 leading from the blower is divided transversely by a hingedly mounted deflecting vane 41. The duct 13 is also divided longitudinally by twin vanes 42. For maintaining the vehicle in a horizontally stabilized attitude these vanes 41, 42 divide the airflow from the common duct 13 into four equal volumes. An actuator 43 can swing vane 41 rearwardly, to direct a greater volume of air to forward quadratures A and B, and less to rear quadratures C and D. An actuator 44 can swing vanes 42 to starboard, to direct more air to port quadratures A and C, and less to starboard quadratures B and D. By such regulation the pitch and roll of the vehicle can be controlled.

Directional control can be effected by any suitable or conventional means. For example, rudder vanes 45, to the rear of jets issuing at 12, are swingable upon vertical axes by an actuator 46 (see Figure 3). A divided elevator 47 can be supplied for pitch control at high speeds and can be operated differentially for roll control.

The velocity of the film of air issuing from the jet nozzles 12 or 12A is dependent upon the depth of the same and the pressure within the plenum chamber. Optimum chord of the airfoils 15 is dependent on air film thickness and velocity. The quantity and pressure of the air required for the plenum chamber are dependent on the total number of nozzles, the length of the nozzles, and the nozzle depth, and their spacing (which should be within the range indicated above), or in other words, on the aggregate nozzle area. This aggregate area, and pressure, determine the blower requirements. An optimum compromise, or minimax, must balance these several variables.

Attitude control at normal forward speed can be effected by proportioning the lift effect developed by air issuing from ahead of and behind the center of gravity, or at the respective sides thereof, this center of gravity in this particular design being in the vicinity of the intersection of partitions 10 and 11.

The vehicle being ground-borne upon wheels 23 and 33, air pressurized by the blower within the enclosure 3 is delivered by way of duct 13 and past attitude control vanes 41, 42, and is delivered more or less in equal volumes to the chambers A, B, C, and D. It issues at the several jets 12, reaching high velocity as it follows the airfoil shapes 15, and through the restricted jet nozzles 12. The Coanda effect causes the issuing jets to tend to follow the airfoils 15, and this prevents stagnation within the boundary layer. The cumulative effect is to create a very appreciable lift, equalized between the several quadratures. This lift effect will be sufficient to lift the load. Now, by increasing the lift at the nose and decreasing it at the tail, simultaneously supplying forward thrust at 31, the vehicle moves ahead and rises. When the vehicle attains an appreciable forward speed, the exact value whereof depends upon its specific design, it will be found that sufficient lift is generated by its body contours to sustain it, or if stub wings are provided (as are indicated at 19 in FIGURE 4), these will help to sustain the vehicle, and the power plant can then be devoted largely to propulsion, rather than to expulsion of air through the nozzles 12. The vehicle when airborne can rise to normal flight altitudes. It can descend by varying the lift at the nose relative to that at the tail, in the manner already described, or by decreasing the total lift, by a more or less vertical descent.

Either the form illustrated in FIGURES 1 to 5 or that illustrated in FIGURE 6 can hover, but the form of the vehicle shown in FIGURE 6 is especially designed for hovering flight. The structure 1' is circular in plan shape, with the jet nozzles 12 arranged circularly, and relatively closely spaced, each discharging radially outwardly, and with equal directional effect. Attitude control is effected by varying the relative discharges from the quadratures defined by the partitions 10 and 11. In this form some type of separate propulsion means may be required, and if these are arranged properly, the vehicle can move in any direction with equal facility. The form shown in FIGURES 1 and 2 can hover also, notwithstanding the moderate propulsive effect of the jets at 12. This is accomplished by varying the lift effect at the nose as compared to that at the tail, so that any forward propulsive effect is balanced against the rearward effect of tilting the nose upwardly.

The partitions 10 and 11 have been shown as directed longitudinally and transversely, respectively, to define a forward and rear chamber A and C at the port side, and forward and rear chambers B and D at the starboard side. These partitions obviously might be arranged diagonally, to define one forward and one rearward quadrature, and one quadrature at port and one at starboard.

Instead of dividing the space within the structure 1 wholly into the four quadratures, it might be divided into one forward and two rearward chambers, or vice versa, but also it might be further divided to provide an additional area, preferably one located centrally of the upper surface, that is devoted solely to the production of lift, perhaps arranged as in FIGURE 6, together with other areas that are devoted to roll and pitch control. These latter may surround or be located about such a central lift area.

Figure 8:
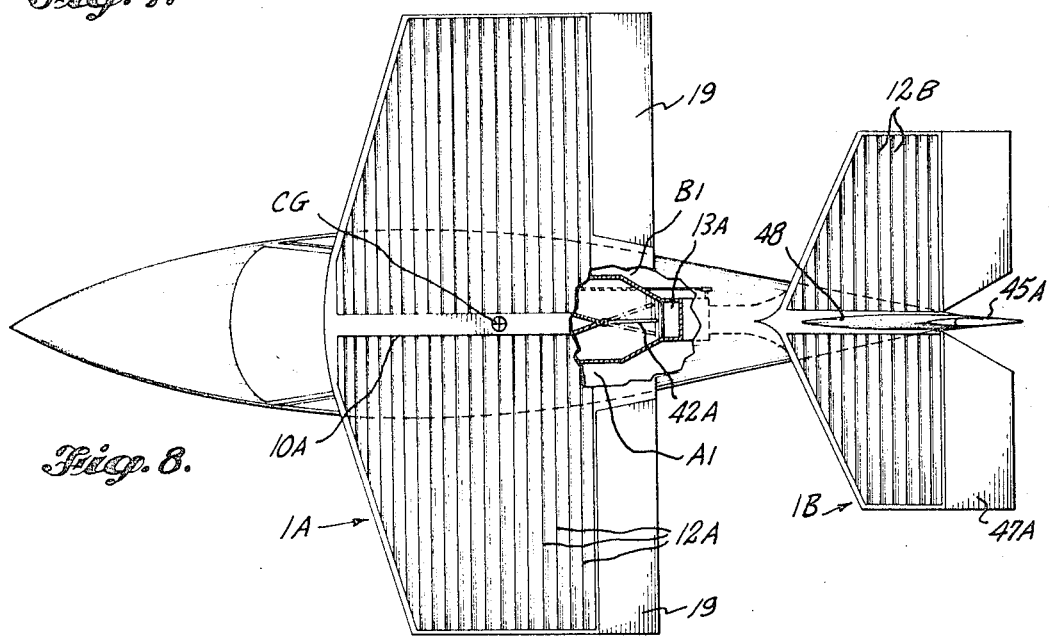
FIGURE 8 is a plan view, partly broken away, illustrating the principles of the invention embodied in a vehicle that externally resembles a conventional airplane.
Figure 9:
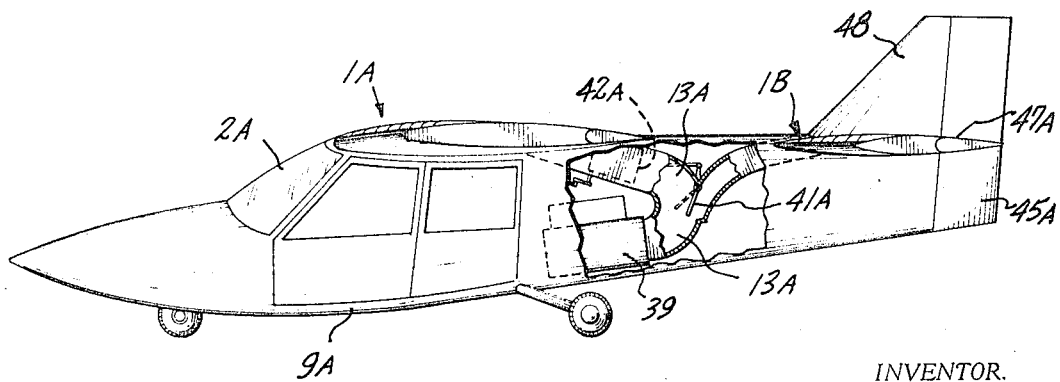
FIGURE 9 is an elevational view, also partly broken away, of the same vehicle.

A lift vehicle employing the same principles, but of somewhat more conventional external appearance, is shown in FIGURES 8 and 9. In this vehicle the lift surface 1A resembles the wings of an airplane, and supports the body 9A. The surface 1A may be contoured or cambered, although this is not essential, to afford additional lift in flight. Its interior is hollow, and is divided along the longitudinal center line (but not spanwise) by a partition 10A, whereby are formed a portside chamber A1 and a starboard chamber B1. An empennage, spaced aft of the lift surface 1A, includes a second and smaller lift surface 1B, and may also have a vertical stabilizer 48 and a rudder 45A, and an elevator 47A. The supplemental lift surface 1B is hollow, but is not necessarily nor preferably divided.

The power plant may be considered as located in the body at 3A, with the control cabin ahead thereof, at 2A. This power plant, as in the vehicle previously described, includes a blower 39 or multiple blowers that supply air under pressure within the hollow structure 1A. This structure 1A has parallel and closely spaced nozzles 12A in its upper surface formed by closely spaced adjacent airfoils 15A (see FIGURE 7). The jet nozzles so formed are directed generally horizontally over the rearward airfoil and past the next nozzle downstream, for the nozzles are sufficiently closely spaced that the issuing jets do not decelerate, and successive jets cooperate to produce lift. The spacing of the nozzles is governed by several factors, already mentioned above. An optimum spacing might be in the range of four to eight inches in a vehicle other than a quite small one.

It will be noted that the center of gravity of the vehicle is located aft of the center of lift of the surface 1A, which unless counteracted would pitch the nose upwardly. This tendency can be counteracted by slotting the entire separate horizontal stabilizer 1B, to define lift-producing nozzles 12B similar to the nozzles 12A, whence issues air from the blower 39 or a separate blower, or alternatively the stabilizer as a whole might be aerodynamically active. Lift produced in either such manner, or both, will act to stabilize the vehicle with respect to the C.G.

Roll control can be accomplished by differentially pressurizing the port chamber A1 and the starboard chamber B1. Air from the blower is delivered by a duct 13A and can be proportioned by deflector means 42A to vary the volume in chambers A1 and B1. Similarly proportioned air could be delivered to opposite sides of an interiorly divided surface 1B, if the latter is divided, or as shown, a deflector 41A permits the volume to the hollow horizontal stabilizer to be varied, in relation to the volume delivered to surface 1A, for pitch control. Alternatively or additionally, the rudder 45A, the hingedly mounted elevator 47A, and ailerons 19 may assist in or be relied on for attitude control. Actuators for such controls have not been shown, but would be conventional, or more or less as shown in FIGURES 3 and 4.

It will be noted that control is effected by producing forces at moment arms about the CG, but that division of a hollow body into four quadratures is not necessary; three only are shown in FIGURES 8 and 9, hence the word "quadrature" as used in the claims should not be taken to mean necessarily four only, but should be read in a general sense, as meaning one of several divisions. Indeed, even the sustaining surface 1 might have a fifth division, centrally located, and arranged to produce lift only, while the four surrounding divisions effect control as well as lift.

The vehicle of FIGURES 8 and 9 is not shown as having a propulsion power plant, but can be so equipped. If greater than moderate speeds are required it should have a power plant. That power plant might be a jet engine or equivalent, as suggested in FIGURES 1, 2 and 3, or it might drive a conventional propeller. The present invention is primarily concerned with the production of lift and the control of attitude, and any suitable propulsion means can be used.

The principles of this invention may be incorporated in a captive vehicle, instead of a free vehicle. Such a captive vehicle, powered from a self-supported power plant and blower, or from a plant and blower that is ground-borne, could be employed to lift loads, replacing conventional cranes or the like, and free of limitations thereof as to height.

I claim as my invention:

1. In an aerodynamic lift vehicle having a given operational weight, means defining at least one plenum chamber which extends substantially horizontally over a major portion of the vehicle and is open across the top to the ambient surroundings of the vehicle, and means for pressurizing the gas in the chamber for discharge into the surroundings through the top opening thereof, said top opening having a multitude of elongated air-foils extending in spaced, parallel relationship thereacross whose upper surfaces are substantially coplanar with one another and whose lower surfaces are inclined thereto so that a series of elongated nozzles are formed between the airfoils which discharge into the ambient surroundings substantially tangentially to the aforesaid upper surfaces thereof, the airfoils having a curved cross section between the leading and trailing edges thereof, the lower surfaces of the airfoils inclining toward points on the upper surfaces of the adjacent airfoils, and said upper surfaces of the airfoils arching smoothly from one nozzle to the next so that the discharges from the nozzles interact with one another to generate an overall lift effect across the opening which is adapted in relation to the weight of the vehicle to displace the vehicle in a direction generally perpendicular thereto.

2. The aerodynamic lift vehicle according to claim 1 wherein the leading edges of the airfoils are substantially coplanar with one another.

3. The aerodynamic lift vehicle according to claim 2 wherein the leading edges of the airfoils are broad and flat in relation to the trailing edges thereof.

4. The aerodynamic lift vehicle according to claim 1 further comprising means for varying the generated lift effect on at least a pair of relatively opposite sides of the vehicle's center of gravity, for attitude control of the vehicle.

5. The aerodynamic lift vehicle according to claim 4 wherein the vehicle is equipped with at least two plenum chambers on relatively opposite sides of its center of gravity, and there are means for varying the volumes of gas discharged through the top openings thereof.

6. The aerodynamic lift vehicle according to claim 4 wherein the plenum chamber is partitioned into compartments on relatively opposite sides of the vehicle's center of gravity, and there are means for varying the volumes of gas discharged through the areas of the top opening corresponding thereto.

7. The aerodynamic lift vehicle according to claim 6 wherein the partitioning passes through the vehicle's center of gravity.

8. The aerodynamic lift vehicle according to claim 6 wherein the partitioning extends diagonally of the vehicle to divide the plenum chamber into four compartments.

9. The aerodynamic lift vehicle according to claim 6 wherein the partitioning extends longitudinally and transversely of the vehicle to divide the plenum chamber into four compartments.

References Cited

UNITED STATES PATENTS

| | | | |
|---|---|---|---|
| 2,418,380 | 4/1947 | Warner | 144—12 |
| 3,184,185 | 5/1965 | Brocard | 244—42 |
| 1,781,910 | 11/1930 | Anker-Holth | 244—12 |
| 2,468,787 | 5/1949 | Sharpe | 244—12 |
| 2,873,931 | 2/1959 | Fleischmann | 244—42 |
| 2,959,377 | 11/1960 | Kaplan | 244—42 X |

MILTON BUCHLER, *Primary Examiner.*

THOMAS W. BUCKMAN, *Assistant Examiner.*

U.S. Cl. X.R.

244—36, 40, 45; 308—72